US008583138B2

(12) United States Patent
Cahill et al.

(10) Patent No.: US 8,583,138 B2
(45) Date of Patent: Nov. 12, 2013

(54) COMMUNICATIONS SYSTEM WITH EFFICIENT MULTIPROTOCOL-AWARE CHANNEL SELECTION AND INTERFERENCE AVOIDANCE

(75) Inventors: Stephen Cahill, Felton, CA (US); Mark Clark, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 217 days.

(21) Appl. No.: 12/849,625

(22) Filed: Aug. 3, 2010

(65) Prior Publication Data
US 2012/0034937 A1 Feb. 9, 2012

(51) Int. Cl.
*H04W 72/00* (2009.01)

(52) U.S. Cl.
USPC ............ 455/454; 455/552.1; 455/1; 455/63.1

(58) Field of Classification Search
USPC .................. 455/454, 63.1, 552.1, 1
See application file for complete search history.

(56) References Cited

U.S. PATENT DOCUMENTS

| 5,907,812 | A | * | 5/1999 | Van De Berg | 455/461 |
| 2007/0010255 | A1 | * | 1/2007 | Liu et al. | 455/450 |
| 2011/0092200 | A1 | * | 4/2011 | Charbit et al. | 455/424 |

* cited by examiner

*Primary Examiner* — Vladimir Magloire
(74) *Attorney, Agent, or Firm* — Chuang Intellectual Property Law (57) ABSTRACT

In one example, a method and system for selecting a channel for use with a mobile communication device is described. A shared frequency band shared between a first wireless communications protocol and a second wireless communications protocol is scanned to identify an active second wireless communications protocol channel. One or more first wireless communications protocol channels corresponding to the active second wireless communications protocol channel are removed from a list of selectable channels. A first wireless communications protocol channel is selected from the list of selectable channels.

23 Claims, 11 Drawing Sheets

COMMUNICATIONS SYSTEM WITH EFFICIENT MULTIPROTOCOL-AWARE CHANNEL SELECTION AND INTERFERENCE AVOIDANCE

BACKGROUND OF THE INVENTION

Multiple wireless communication protocols may often simultaneously operate within the same radiofrequency band. For example, a variety of wireless communication protocols operate in the industrial, scientific, and medical (ISM) band defined by the ITU-R in 5.138, 5.150, and 5.280 of the radio regulations. These wireless communication protocols operating in the ISM band include band converted variations of the digital enhanced cordless telecommunications (DECT) protocol, IEEE 802.11 (also referred to herein simply as "802.11"), and Bluetooth. Where multiple frequency-overlapping wireless communication protocols are simultaneously in operation in a given region, interference across networks can undesirably affect performance of one or more systems.

For example, a DECT system monitors channels using a least-interfered-channel/listen-before-talk algorithm to select a channel and timeslot to use, and a move-on-error algorithm to change channels when corruption is observed on a link already set up. Unfortunately, for the case of sharing spectrum between a DECT-protocol-derivative product and an 802.11-protocol service, DECT's least-interfered channel algorithm does not detect 802.11-protocol usage of 802.11 channels efficiently. The DECT scanning algorithm was designed for a dedicated band. The major problems with using such an approach in a band shared with other protocols are due to the fact that 802.11 traffic is bursty. A channel may be in use by the 802.11 protocol for short bursts only, and very irregularly. As a result, the typical DECT-standard monitoring process of periodically measuring the signal level in a channel and timeslot, while effective at determining the channel/timeslot occupancy by another DECT system, does not typically detect the presence of an 802.11 system using that channel.

Figure 1A:
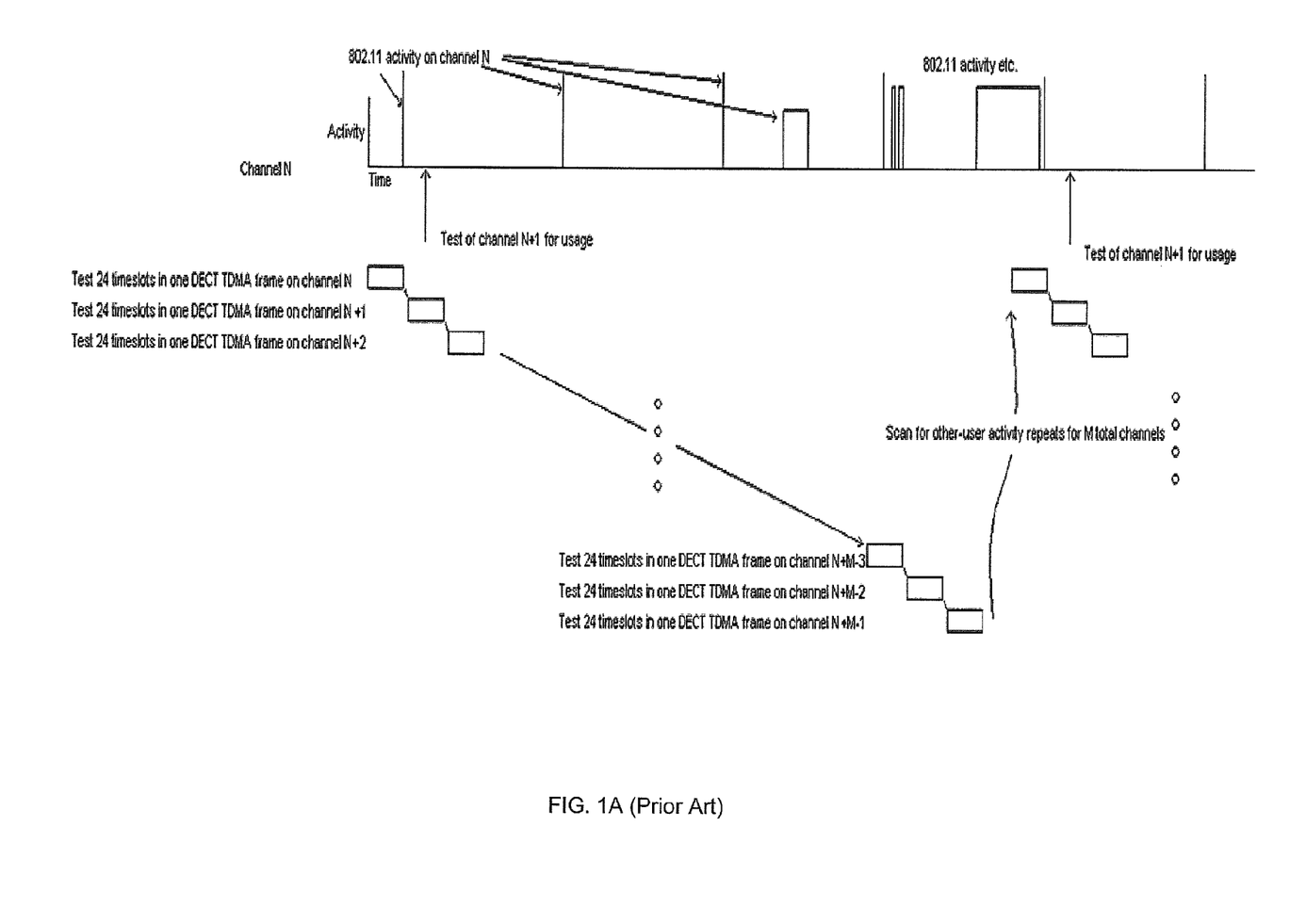
FIG. 1A illustrates scanning for network activity in a prior art system.

FIG. 1A illustrates the detection method which DECT-derived products use to validate that a channel is free to use prior to starting transmissions on that channel. The DECT-derived system checks the candidate channel list periodically, looking at the signal level during one DECT timeslot, from time to time, to see if that timeslot is unused on that channel. The prior art DECT scanning system utilizes a round-robin scanning algorithm. The scanning algorithm tests twenty-four timeslots in one DECT TDMA frame on channel N, N+1, N+2 . . . N+M−3, N+M−2, N+M−1. The scan for other user activity repeats for M total channels. If the interference source is continuous, or if it repeats at 10 ms intervals, the testing will catch the usage of the channel by the other user. 802.11 usage, though, may be at other rates; commonly the 802.11 access points transmit a beacon every 100 ms, but data may be present or not at any time on the channel. The test of channel N may miss IEEE 802.11 activity on channel N in the round-robin period scanning algorithm.

In one prior art solution, more long-term observation time is dedicated to each channel and timeslot so as to increase the probability of observing a short burst. This approach is problematic in that there are up to 86 channels and 12 duplex timeslot pairs. If other-user bursts occur at the rate of one per second for a lightly loaded channel, the probability of detection remains low for any individual monitoring event if there are many timeslots and channels to scan, and usage of any channel/timeslot combination by an other-user service is irregular, so many monitoring events are required. With the high number of channels and timeslots to observe, reliable qualification and ranking of available native DECT protocol channels for the 802.11 interferer protocol interference is slow, resulting in undesirably-slow state-changes on entering service, coming into range, or in responding to changes in an agile 802.11 system.

In one prior art solution, an IT manager using a central management tool configures the DECT system by assigning certain channels for use. The IEEE 802.11 system is separately configured to use channels from its own selectable channel list which would not overlap with the selected DECT channels in use. While this approach addresses some of the technical issues, it requires action by the IT manager and does not result in an individual DECT unit being optimally configured for the environment in its physical proximity. The resulting implementation imposes inefficiencies on both the DECT system installation and on the 802.11 installation. On the 802.11 side, such manual planning prevents the 802.11 system from being frequency-agile in response to changes in load. With respect to the DECT system, locking out all 802.11-used-channels in a multi-DECT-unit deployment area precludes the use of channels that happen to be not in use by the 802.11 system in a particular DECT unit's locale, which reduces the possible density for the DECT system.

Thus, improved systems and methods for services in a shared frequency band provided by different protocols are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Methods and apparatuses for radio system channel selection are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to radio communications systems operating with a native protocol in frequency bands which may be shared with other systems incorporating other protocols. In one example, the methods and systems utilized herein are implemented in a band-converted DECT system which shares an ISM band with an 802.11 system, and contains a synchronization element for qualifying transmissions as native-protocol (DECT) or not native protocol (e.g., 802.11).

In one example, a method for channel selection includes scanning a shared frequency band shared between a first wireless communications protocol and a second wireless communications protocol, where the first wireless communications protocol is utilized by a mobile communications device. The scanning includes identifying an active second wireless communications protocol channel by scanning a second wireless communications protocol channel center frequency signal level for each channel of the second wireless communications protocol within the shared frequency band. The method includes, responsive to identifying the active second wireless communications protocol channel, removing from a list of selectable channels one or more first wireless communications protocol channels corresponding to the active second wireless communications protocol channel. The method further includes selecting for usage a first wireless communications protocol channel from the list of selectable channels.

In one example, the method further includes, following selecting for usage a first wireless communications protocol channel from the list of selectable channels, periodically monitoring a quality of a selected first wireless communications protocol channel. The periodic monitoring includes scanning a second wireless communications protocol channel center frequency signal level, the second wireless communications protocol channel corresponding to the selected first wireless communications protocol channel. The second wireless communications protocol channel center frequency may also be scanned for a first wireless communications protocol synchronization pattern.

The method further includes monitoring a quality of a plurality of non-selected first wireless communications protocol channels. The periodic monitoring includes scanning a second wireless communications protocol channel center frequency signal level for each channel of the second wireless communications protocol not corresponding to the selected first wireless communications protocol channel, where the scanning is operable to identify one or more second wireless communication protocol channels in use. Each second wireless communications protocol channel center frequency not corresponding to the selected first wireless communications protocol channel may also be scanned for a first wireless communications protocol synchronization pattern. The method further includes validating as available for use non-selected first wireless communications protocol channels corresponding to each channel of the second wireless communications protocol not in use.

In one example, a mobile communication device includes a processor, a transceiver to transmit and receive data using a native wireless communications protocol, an antenna, and a memory. The memory stores a channel selection application configured to scan a shared frequency band shared between the native wireless communications protocol and an interferer wireless communications protocol to identify an active interferer wireless communications protocol channel. The channel selection application is configured to remove from a list of selectable channels one or more native wireless communications protocol channels corresponding to the active interferer wireless communications protocol channel. The channel selection application is further configured to select for usage a native wireless communications protocol channel from the list of selectable channels.

In one example, a method for channel selection includes scanning a shared frequency band shared between a first wireless communications protocol and a second wireless communications protocol. The scanning includes scanning each channel of the second wireless communications protocol falling within the shared frequency band to identify an active second wireless communications protocol channel. The method further includes scanning the active second wireless communications protocol channel for a first wireless communications protocol synchronization pattern to confirm second wireless communications protocol activity. The method includes removing from a list of selectable channels one or more first wireless communications protocol channels corresponding to the active second wireless communications protocol channel. A first wireless communications protocol channel is selected from the list of selectable channels.

In one example embodiment of the invention, a system and method for channel selection by a device, such as a mobile communication device, includes a two part qualification scanning process prior to channel selection and a two part maintenance scanning process following channel selection. Scans are performed for received signal strength (RSSI) and for native-protocol synchronization patterns in the received signals. In this example, the native protocol used by the device is DECT and a likely frequency overlapping interferer protocol is an IEEE 802.11 protocol. In further examples, the device may use a different native protocol and a different interferer protocol may be the likely interferer.

In part one of the qualification scanning process, for each of the 86 available channels the 24 available timeslots in each channel are scanned in a rapid manner akin to that used in standard DECT, based on RSSI only. This scan will detect other DECT-derived systems that are operating with a 10 ms-framed transmit signal. If an other-user signal is present, it will be detected, being also framed at 10 ms.

In part two of the qualification scanning process, the device periodically scans the frequency band shared between the native protocol and the interferer protocol, where the frequencies to test are chosen using a process in which the known center frequencies and bandwidths for the likely interferer protocol are used to determine a large set of frequencies which do not need to be tested. Thus, one frequency in each interferer protocol channel bandwidth provides interferer protocol usage results valid for all native-protocol channels falling within the interferer protocol channel's frequency span.

To avoid falsely characterizing as interferer protocol usage those other-user native-protocol signals that fall within the interferer protocol channel's span and happen to occur on the tested frequency, each test in this scan comprises both signal level and a synchronization pattern search. Received signals in which a native-protocol synchronization pattern is detected are so characterized. Detection of the native-protocol synchronization pattern indicates interference resulting from an other-user of the native protocol in the vicinity, and selection of the corresponding native protocol channel is avoided. Lacking this characterization, a signal detected at the test indicates the presence of an interferer protocol user, and the device considers all the native-protocol channels within the interferer protocol channel's span as blocked for use for the channel usage coherence period.

This characterization check may include a first test for RSSI only and a repeat test at a [t+(10 ms−δ)] initiation point relative to the first "signal detected" scan point in time [t] and lasting for the duration of one timeslot plus (2)(δ), where δ is timeslot/2. This retest ensures that such a test fully spans the point in time containing the synchronization pattern for a signal framed at a 10 ms rate but not timeslot synchronized with the timeslot boundaries for the test in which the signal was first detected. The absence of a synchronization pattern present in such a test would fully characterize the signal as interferer protocol. In the event for the interferer protocol being 802.11 at 5.8 GHz, each incremental test in the scan is at just one frequency with each of the five available 802.11 channels in the shared 5.8 GHz ISM frequency band. The scan iterates in sets of five incremental tests qualifying the whole band for that set of tests. The probability Pi of detecting/intercepting an asynchronous burst of usage for one test on anyone of those 5 channels during the ensemble of tests is:

$$P_i=[1/5]f(T_s,T_d,T_b,R_b)$$

where
$T_s$=setup time to prepare the device for a test of an individual frequency
$T_d$=dwell time measuring for peak RSSI during that test
$T_b$=the average burst time
$R_b$=the average rate at which bursts occur This offers a significant speed advantage for a given Pi to complete a qualification scan, relative to the case where the DECT scan is used, where, for an 86-channel system, the probability $P_i$ is:

$$P_i=[1/86]f(T_s,T_d,T_b,R_b).$$

The number of iterations to qualify a channel for usage is selected based on the desired worst-case maximum probability for erroneously selecting a channel that is occupied. Optionally, the device may elect to scan one frequency or the group of frequencies containing the maximum power in one known interferer protocol likely-interferer's channel repetitively, and so to most rapidly find a single available channel for the earliest usage, then progressing though the available interferer protocol channels using same-interferer protocol channel scans-until-qualified to obtain a list of usable interferer protocol channels in the most rapid manner.

In part one of the maintenance scanning process, the device periodically checks for RSSI indication in each timeslot in each channel available to it defined by the native protocol. This testing allows the device to maintain a list of channel/timeslot sets which other devices in proximity using the same protocol are known to be not using. A single test of a timeslot provides assurance that such an other device using that channel/timeslot set is not present at the time of that test, the common protocol being that an other-user would be transmitting either a beacon (short burst) or a traffic bearer (full timeslot) during that timeslot.

In part two of the maintenance scanning process, two features are present:

1) From time to time the device tests, for RSSI and native-protocol synchronization patterns, at least one frequency only in the frequency range bounded by the other interferer channel frequency span for the interferer protocol interferer channel in which the device's occupied channel/timeslot set falls. This testing most rapidly detects the presence of an interferer protocol user of the shared interferer protocol channel in the case where a signal is detected but no synchronization word is present.

2) From time to time the devices tests, for RSSI and native-protocol synchronization patterns, at least one frequency only in the frequency range bounded by the other interferer channel band-edge limits for each of the interferer protocol interferer channels. This testing detects the presence of an interferer protocol user of the interferer protocol channel. For a sufficient number of tests (sufficient according to the desired worst-case maximum $P_i$, as above) without detection of an interferer protocol user of each interferer protocol channel, the set of native-protocol channels falling within the corresponding interferer protocol channel bounds are validated as not in use.

In this manner, a device utilizing a native wireless protocol is able to determine which channels to use that are least likely to result in mutual interference with an interferer wireless communications protocol, when selecting a channel for transmission. Furthermore, during the use of a channel for transmission, the device can detect if usage of the interferer wireless communications protocol shared frequency area begins, as some implementations of the interferer wireless communications protocol are frequency-agile.

The methods and systems described herein advantageously allow a DECT or similar system, otherwise operating without guidance as to what 802.11 usage is being made of the shared spectrum in the area, to most quickly qualify the usage. This allows rapid link-establishment between a headset mobile communication device and a base unit when the headset enters range, reduces the current drain necessary to periodically check for re-entering range when a headset is out of range, and minimizes audio degradation to the device caused by interference from the overlaid 802.11 system. The methods and systems described also allow a DECT or similar system to minimize its adverse impact on an overlaid 802.11 system.

Figure 2:
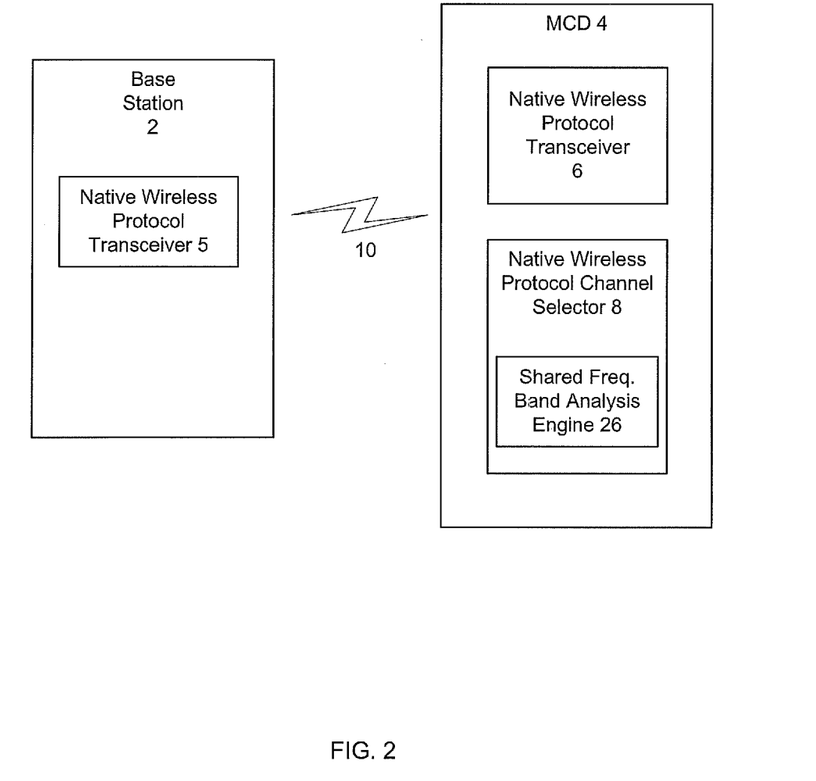
FIG. 2 illustrates a system for selecting a channel at a mobile communication device.

FIG. 2 illustrates a system for selecting a channel at a mobile communication device. The system includes a base station 2 and a mobile communication device 4. In one example, the base station 2 is a personal computer and the mobile communication device 4 is a wireless headset. The base station 2 includes a first native wireless protocol transceiver 5 operable to transmit and receive data using a native wireless communications protocol (also referred to herein as the "native wireless protocol" or "native protocol"). The mobile communication device 4 includes a second native wireless protocol transceiver 6 operable to transmit and receive data to and from the first native wireless protocol transceiver 5 at base station 2 over wireless link 10.

Mobile communication device 4 includes a native wireless protocol channel selector 8 operable to select a native wireless protocol channel on which communications are carried out. Native wireless protocol channel selector 8 includes a shared frequency band analysis engine 26. Shared frequency band analysis engine 26 is operable to analyze interference caused by use of an interferer wireless communications protocol (also referred to herein as the "interferer wireless protocol" or "interferer protocol") in the vicinity of mobile communication device 4, whereby the overlapping interferer wireless protocol is operating at least in part in a frequency band overlapping with the native wireless protocol. For example, the shared frequency band analysis engine 26 may monitor and analyze one or more interferer wireless protocol network parameters such as channels currently active, signal levels, and communications message traffic levels.

Figure 1B:
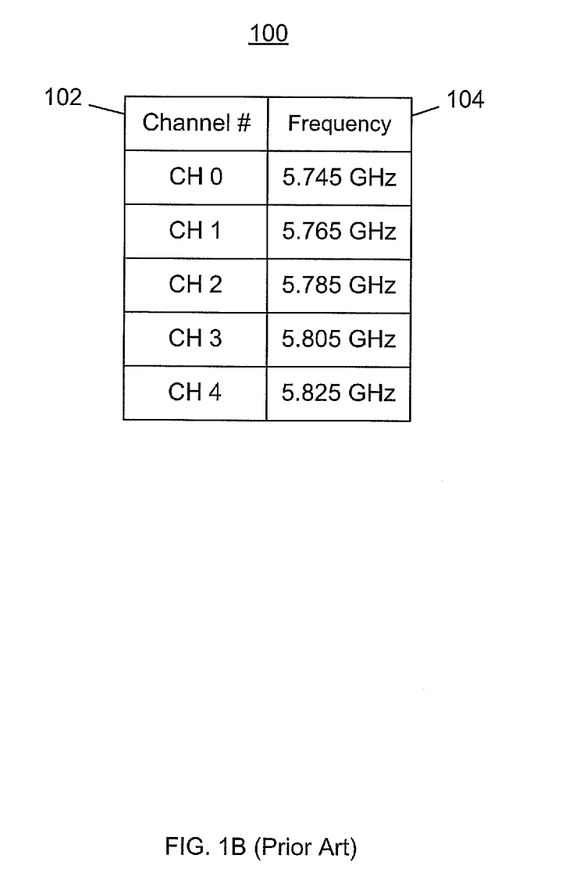
FIG. 1B illustrates channels associated with an interferer wireless communications protocol in one example.

FIG. 1B illustrates channels associated with an interferer wireless communications protocol in one example. In the example table 100 shown in FIG. 1B, channels for an IEEE 802.11 network having five channels are shown, with the channels centered between 5.745 GHz and 5.825 GHz, with each channel 20 MHz wide. Table 100 shows an overview of channel numbers 102 and their center frequency 104. For a 5.8 GHz 802.11 network, the band plan varies depending on the regulatory limitations in different regions, and is generally in several blocks. Table 100 represents a standardized implementation in the USA. One of ordinary skill in the art will recognize that other implementations having different numbers of channels and center frequencies may be utilized in further examples.

Figure 3:
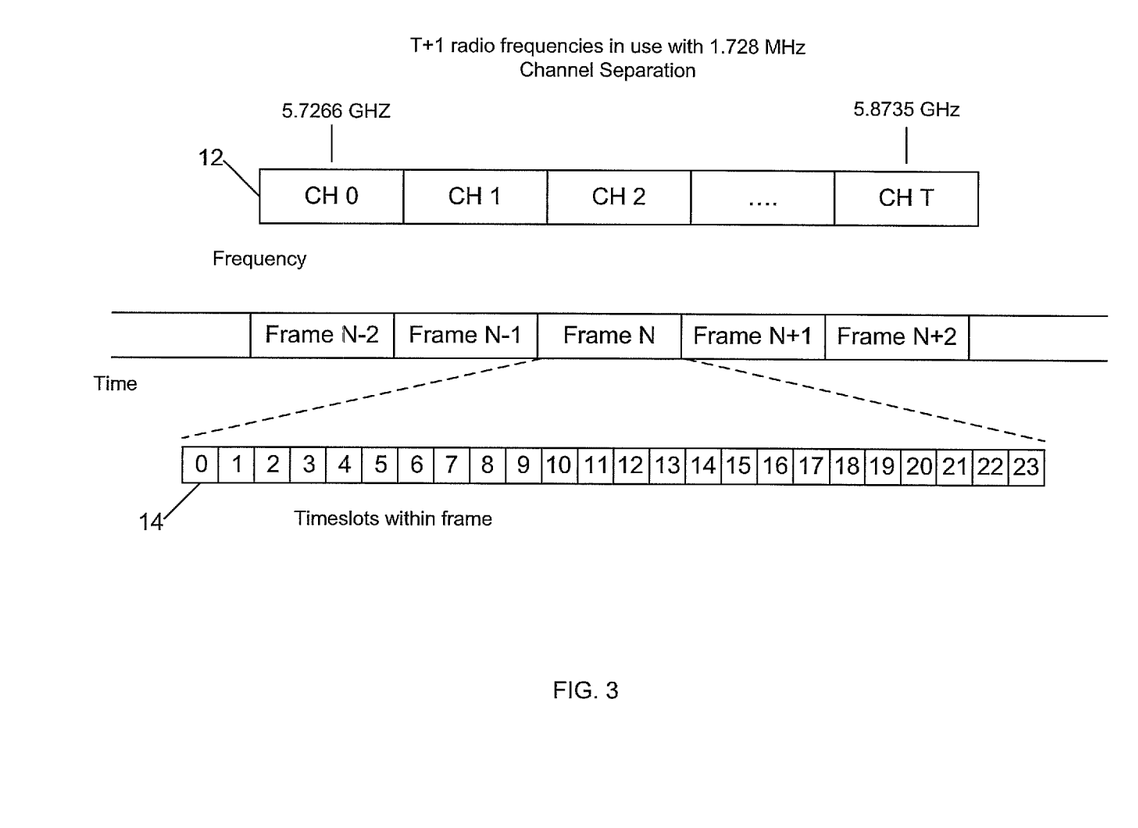
FIG. 3 illustrates a DECT-derived 5.8 GHz band plan channel and frame structure in one example.

In one example, the native wireless communications protocol utilized by mobile communication device 4 is a DECT derived 5.8 GHz band system. FIG. 3 illustrates a DECT derived 5.8 GHz band plan channel and frame structure in one example. In the example illustrated in FIG. 3, a system having T channels is illustrated. In one implementation, there are eighty-six channels 12 CH0, CH1, ..., CHT, where T=85 in this example, available for the DECT-derived implementation in the spectrum region around 5.8 GHz. Some channels may not be used because of regulatory limitations in some regions. The eighty-six channels 12 have 1,728 kHz channel separation. The low channel center frequency is 5.7266 GHz and the high channel center frequency is 5.8735 GHz. There are twenty four timeslots 14 per frame, including twelve time slots in a down link direction (i.e., base station 2 to mobile communication device 4) followed by twelve slots for the uplink direction (i.e., mobile communication device 4 to base station 2). One of ordinary skill in the art will recognize that where other DECT systems are utilized, such as those in Europe, these figures will vary.

Figure 4:
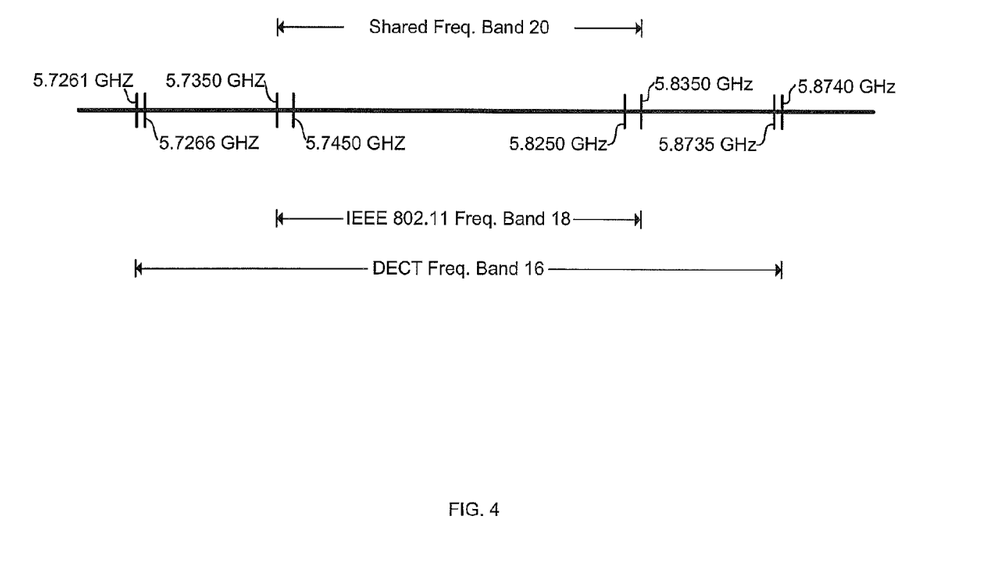
FIG. 4 illustrates a shared frequency band between a native wireless communications protocol and an interferer wireless communications protocol.

FIG. 4 illustrates a shared frequency band between a native DECT wireless communications protocol and an overlapping interferer IEEE 802.11 wireless communications protocol. In the example (not to scale) shown in FIG. 4, a native DECT frequency band 16 between 5.7261 GHz and 5.8740 GHz has center frequencies ranging from 5.7266 GHz and 5.8735 GHz. An interferer IEEE 802.11 wireless communications protocol band 18 between 5.735 GHz and 5.835 GHz has center frequencies ranging from 5.7450 GHz and 5.8250 GHz, resulting in a shared frequency band 20 between 5.735 GHz and 5.835 GHz. The shared frequency band 20 is scanned and analyzed as described herein by shared frequency band analysis engine 28.

Figure 5A:
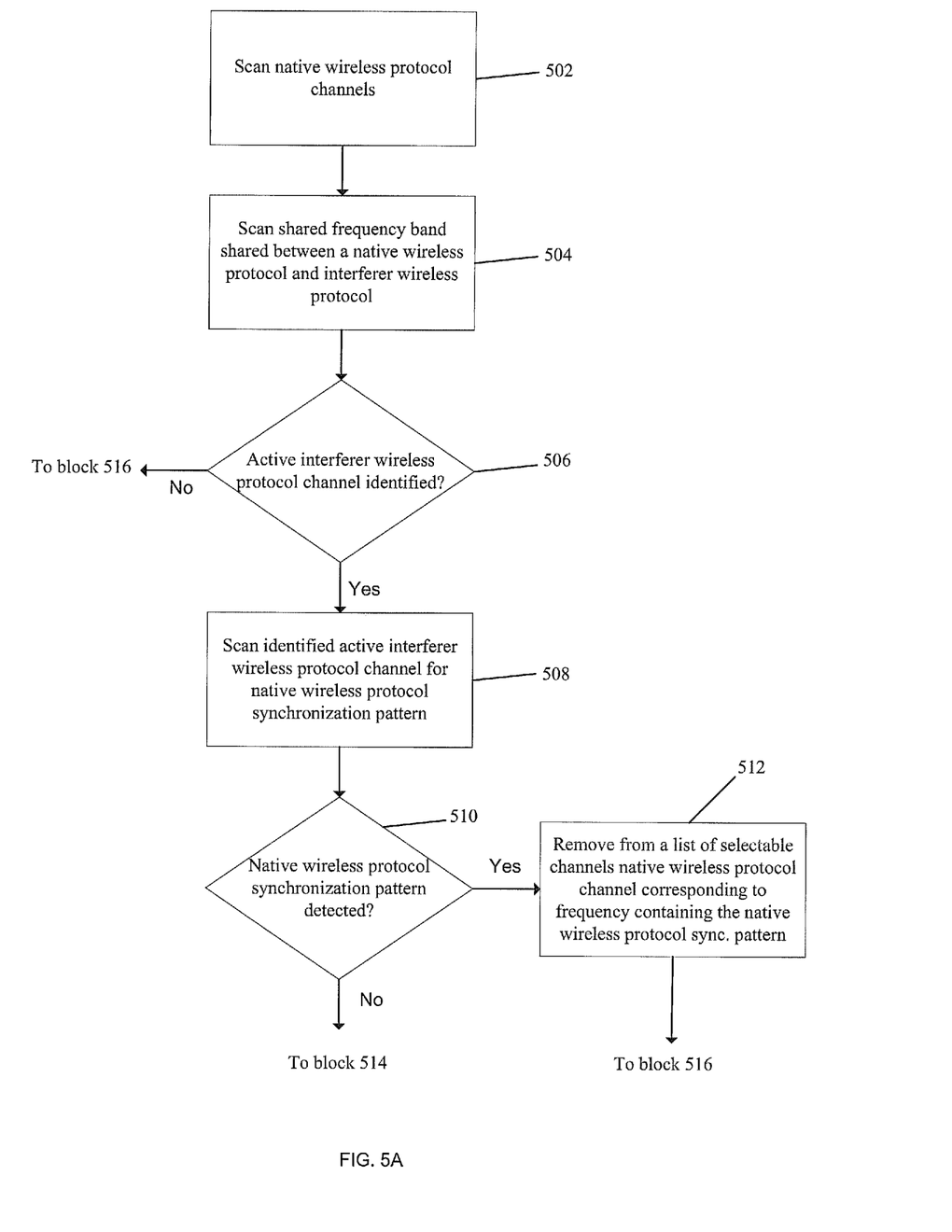
FIGS. 5A and 5B are a flow diagram illustrating a channel selection process for a mobile communication device in one example.
Figure 5B:
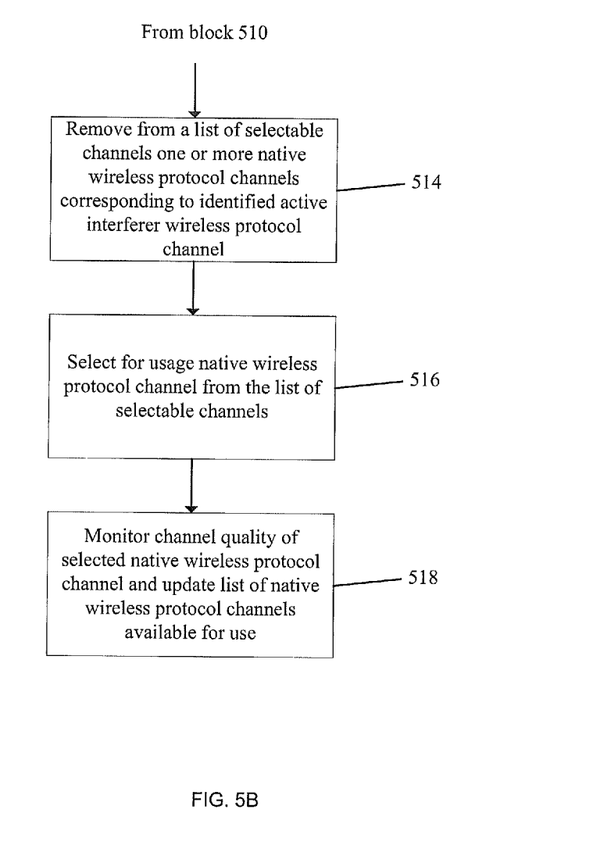

FIGS. 5A and 5B are a flow diagram illustrating a channel selection process for a mobile communication device in one example. At block 502, the native wireless protocol channels are scanned to identify other users of the native wireless protocol. Where other users are identified, the channels associated with such use are removed from a list of selectable channels.

At block 504, the shared frequency band between the native wireless protocol and the interferer wireless protocol is scanned. In one example, the native wireless communications protocol is a Digital Enhanced Cordless Telecommunications protocol and the interferer wireless communications protocol is an IEEE 802.11 protocol. In one example, only the interferer wireless protocol channel center frequency signal level for each channel of the interferer wireless protocol within the shared frequency band is scanned. For example, the other-user RSSI level may be monitored.

At decision block 506, it is determined whether an active interferer wireless protocol channel has been identified. If no at decision block 506, the process proceeds to block 516. If yes at decision block 506, at block 508 the identified active interferer wireless protocol channel is scanned for native wireless protocol synchronization pattern. At decision block 510, it is determined whether a native wireless protocol synchronization pattern has been detected. If yes at decision block 510, at block 512 the native wireless protocol channel corresponding to the frequency containing the native wireless protocol synchronization pattern is removed from a list of selectable channels.

If no at decision block 510, the process proceeds to block 514. At block 514, one or more native wireless protocol channels corresponding to the identified active interferer wireless protocol channel are removed from the list of selectable channels. In the example of DECT and IEEE 802.11 described above in reference to FIG. 1 and FIG. 3, each identified interferer IEEE 802.11 channel corresponds to 12 DECT channels which are removed from the list of selectable channels.

At block 516, a native wireless protocol channel is selected for usage from the list of selectable channels. At block 518, the channel quality of the selected native wireless protocol channel is monitored and the list of native wireless protocol channels available for use is monitored and updated. An example of block 518 is shown in FIG. 6 and FIG. 7.

Figure 6:
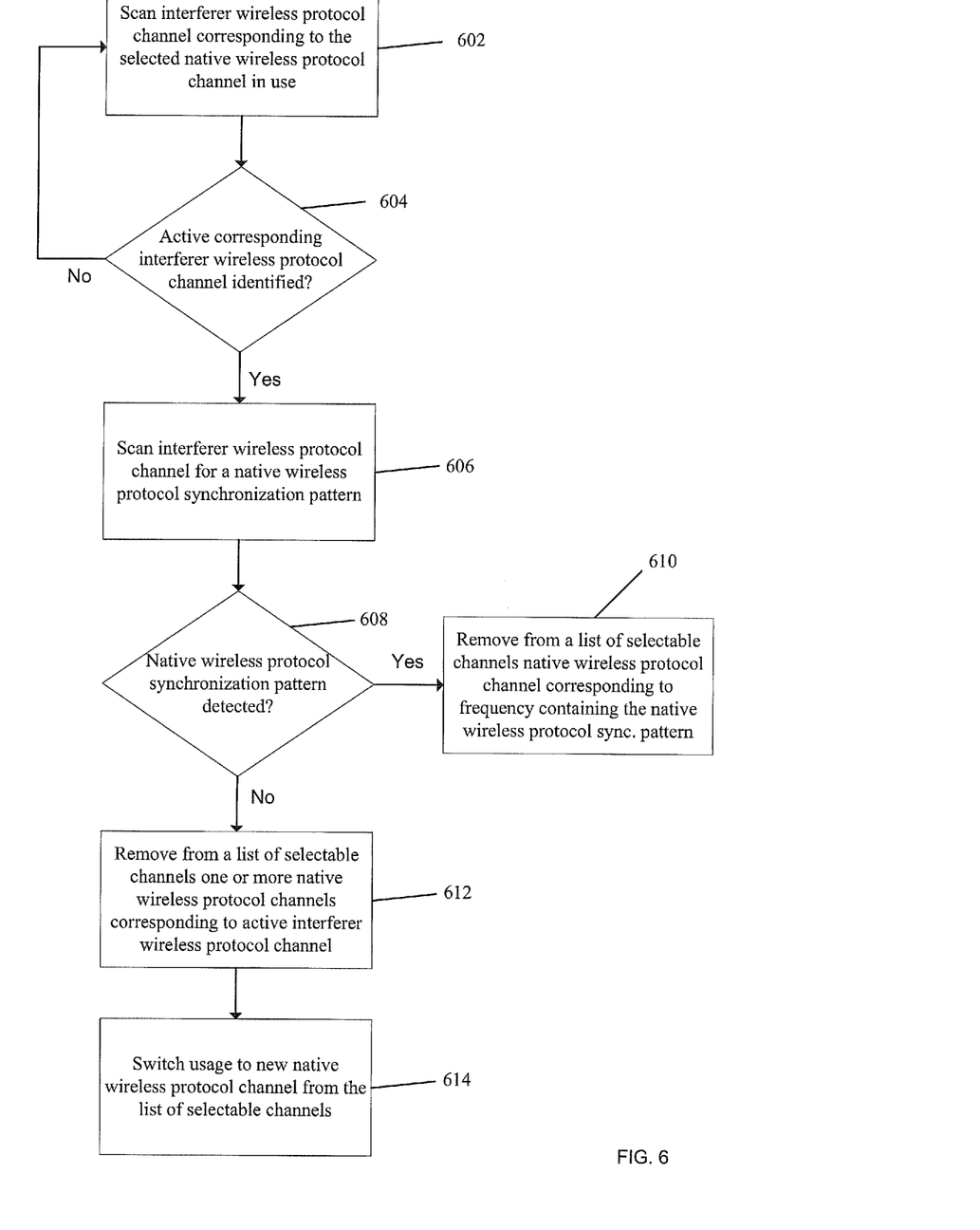
FIG. 6 is a flow diagram illustrating periodic monitoring of the quality of a selected native protocol channel in use.
Figure 7:
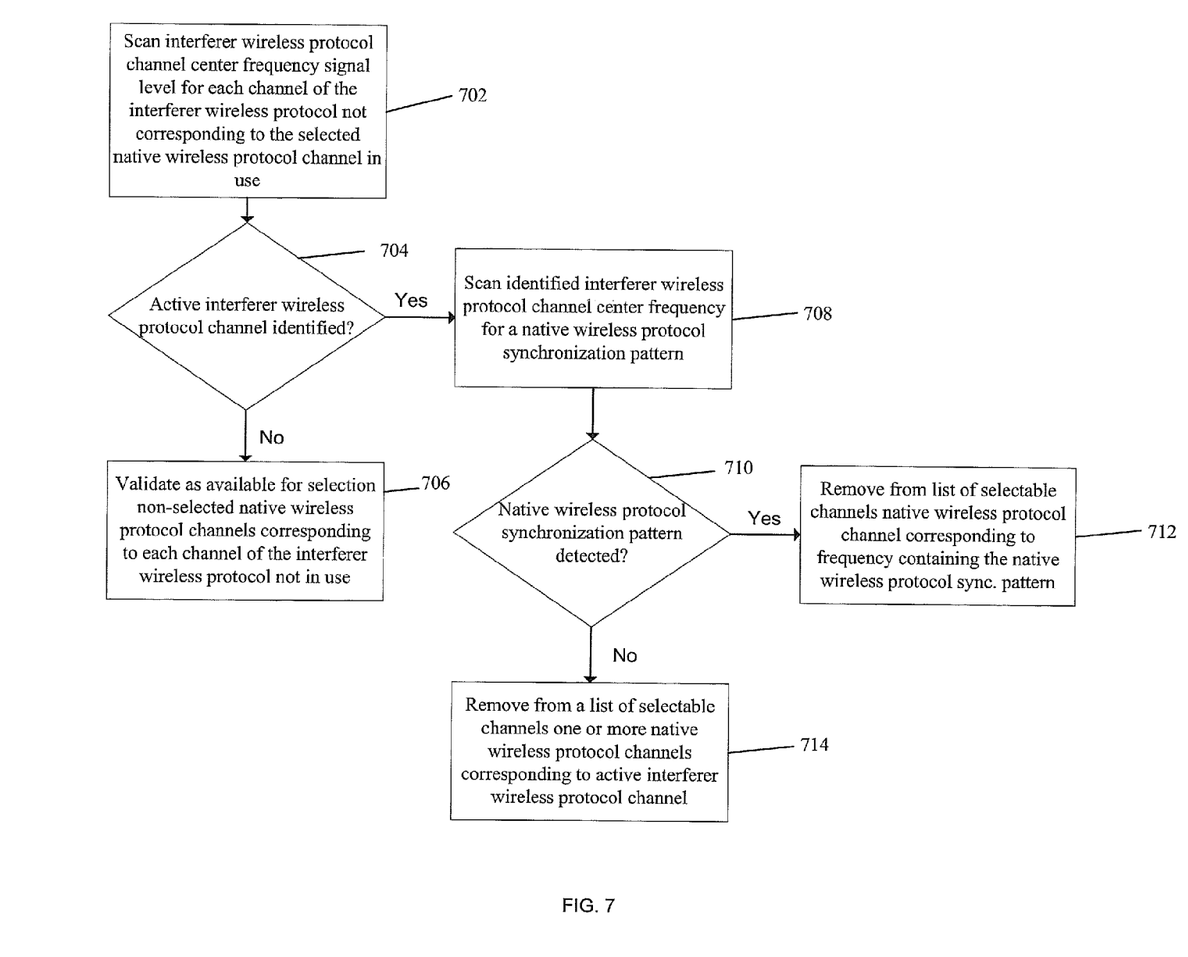
FIG. 7 is a flow diagram illustrating periodic monitoring of the quality of the non-selected native protocol channel in use to update the list of selectable channels in one example.

FIG. 6 is a flow diagram illustrating periodic monitoring of the quality of a selected native protocol channel in use. The monitoring described in FIG. 6 is operable to identify whether following initial selection of the native protocol channel in use, other users of the native protocol have become active or other users of the corresponding interferer protocol channel have become active. Under such conditions, the list of selectable channels is updated and the current operating channel is switched.

At block 602, the interferer wireless protocol channel corresponding to the selected native wireless protocol channel in use is scanned. In one example, only the interferer wireless protocol channel center frequency signal level is scanned. At decision block 604, is determined whether the corresponding wireless protocol channel has become active subsequent to the initial native wireless protocol channel selection. If no at decision block 604, the process returns to block 602 and communication on the selected native wireless protocol channel continues.

If yes at decision block 604, at block 606 the interferer wireless protocol channel is scanned for a native wireless protocol synchronization pattern. In one example, the interferer wireless protocol channel center frequency signal level is scanned for the native wireless protocol synchronization pattern. At decision block 608, it is determined whether a native wireless protocol synchronization pattern has been detected.

If yes at decision block 608, at block 610 the native wireless protocol channel corresponding to the frequency containing the native wireless protocol synchronization pattern is removed from the list of selectable channels. If no at decision block 608, at block 612 one or more native wireless protocol channels corresponding to the active interferer wireless protocol channel is removed from the list of selectable channels. At block 614, communications are switched from the previously selected channel to a new native wireless protocol channel selected from the current list of selectable channels.

FIG. 7 is a flow diagram illustrating periodic monitoring of the quality of the non-selected native protocol channels to update the list of selectable channels in one example. The monitoring described in FIG. 7 is operable to identify whether following initial selection of the native protocol channel, users of an interferer protocol channel have become active. Under such conditions, the list of selectable channels is updated to remove channels corresponding to the active interferer protocol channel.

At block 702, the interferer wireless protocol channel center frequency signal level is scanned for each channel of the interferer wireless protocol not corresponding to the selected native wireless protocol channel in use. At decision block 704, is determined whether an active interferer wireless protocol channel has been identified. If no at decision block 704, at block 706 the non-selected native wireless protocol channels corresponding to each channel of the interferer wireless protocol not in use are validated as available for selection.

If yes at decision block 704, at block 708 the identified interferer wireless protocol channel center frequency is scanned for native wireless protocol synchronization pattern. At decision block 710, it is determined whether a native wireless protocol synchronization pattern has been detected. If yes at decision block 710, at block 712 the native wireless protocol channel corresponding to the frequency containing the native wireless protocol synchronization pattern is removed from the list of selectable channels. If no at decision block 710, at block 714 one or more native wireless protocol channels corresponding to the active interferer wireless protocol channel is removed from the list of selectable channels.

Figure 8:
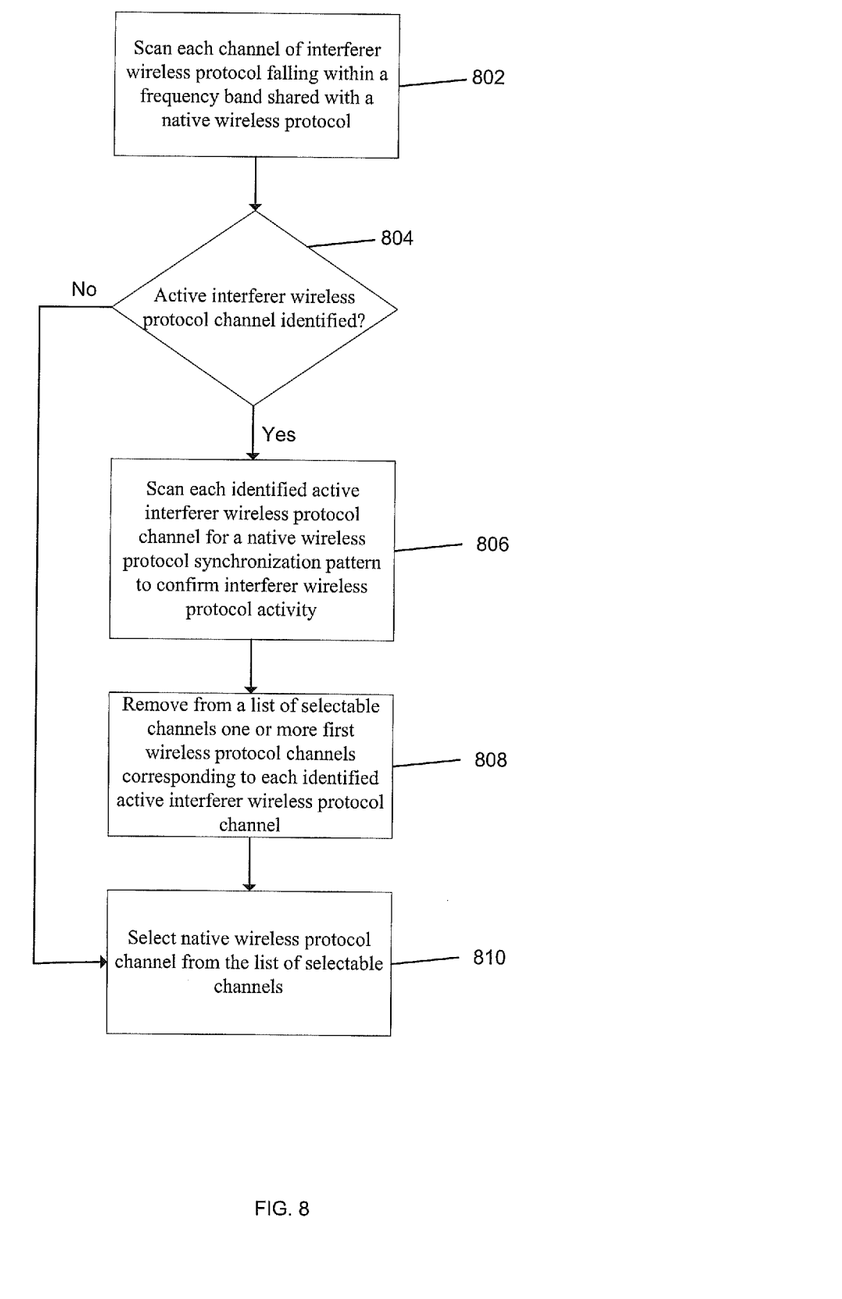
FIG. 8 is a flow diagram illustrating a channel selection process for a mobile communication device in a further example.

FIG. 8 is a flow diagram illustrating a channel selection process for a mobile communication device in a further example. At block 802, each channel of an interferer wireless protocol falling within a frequency band shared with the native wireless protocol of the mobile communication device is scanned. In one example, the native wireless communications protocol is a Digital Enhanced Cordless Telecommunications protocol and the interferer wireless communications protocol is an IEEE 802.11 protocol. In one example, scanning each channel of the interferer wireless communications protocol requires scanning only the center frequency of each channel.

At decision block 804, it is determined whether an active interferer wireless protocol channel has been identified. If no at decision block 804, the process proceeds to block 810. If yes at decision block 804, at block 806 each identified active interferer wireless protocol channel is scanned for a native wireless protocol synchronization pattern to confirm interferer wireless protocol activity. If no native wireless protocol synchronization pattern is detected, the identified interferer wireless protocol channel is confirmed as active.

At block 808, the native wireless protocol channels corresponding to each identified active interferer wireless protocol channel are removed from the list of channels selectable by the mobile communication device. In one example, the process further includes scanning each native wireless protocol channel in the list of selectable channels to identify potential interference resulting from other native wireless protocol users. Any channels having such interference are removed from the list of selectable channels.

At block 810, the mobile communication device selects for use a native wireless protocol channel from the list of selectable channels. In one example, following selection of the native wireless protocol channel, the process further includes periodically scanning an interferer wireless protocol channel center frequency signal level, the interferer wireless protocol channel corresponding to the selected native wireless protocol channel. If an active interferer wireless protocol channel is identified, a new native wireless protocol channel is selected.

In one example, following selection of the native wireless protocol channel, the method further includes scanning an interferer wireless protocol channel center frequency signal level for each channel of the interferer wireless protocol not corresponding to the selected native wireless protocol channel, the scanning operable to identify one or more interferer wireless communication protocol channels in use. A list of usable native wireless protocol channels is generated responsive to an identification of the one or more interferer wireless communication protocols in use.

Figure 9:
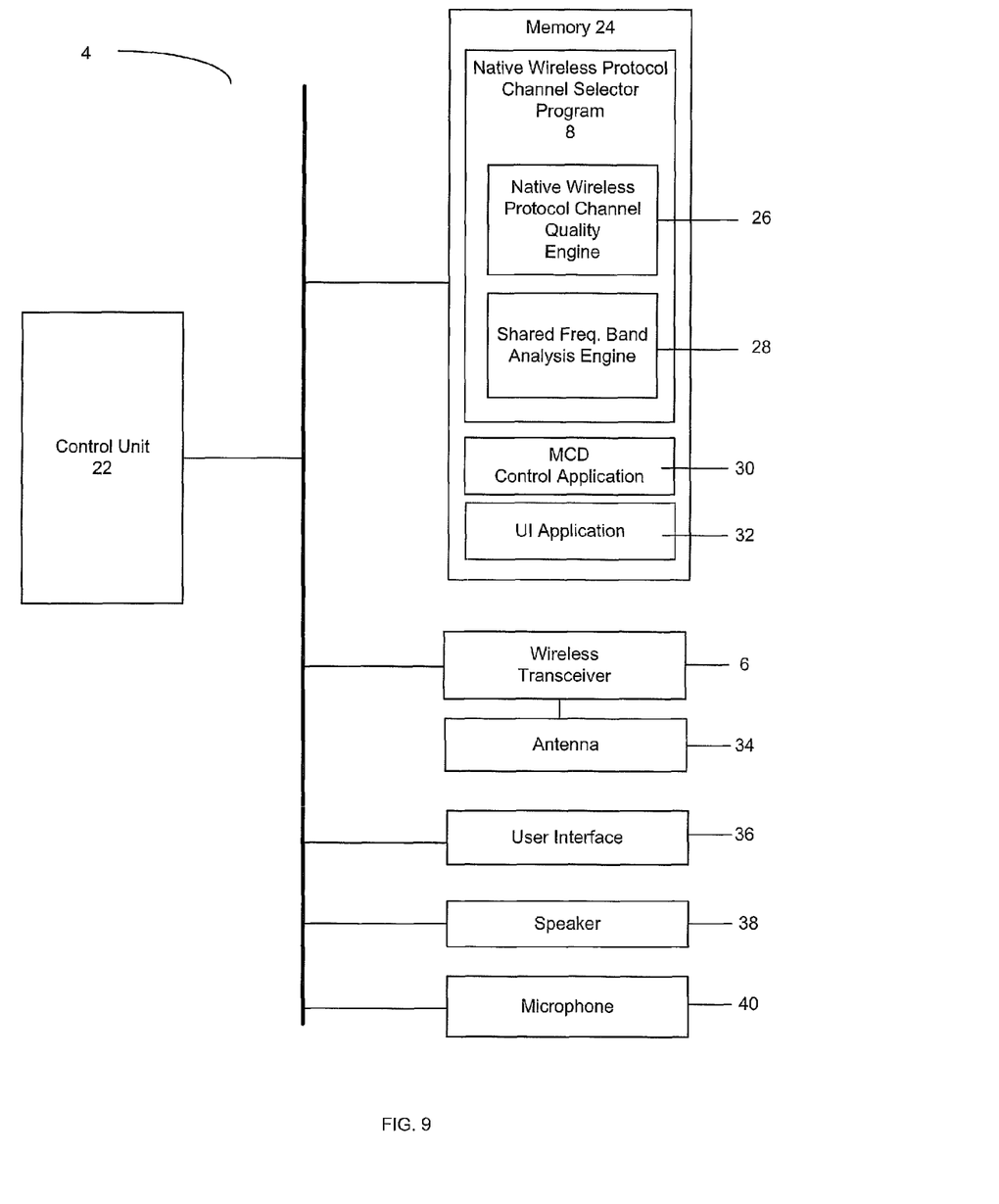
FIG. 9 illustrates a simplified block diagram of a mobile communication device in one example.

FIG. 9 illustrates a simplified block diagram of a mobile communication device with optimized channel selection in one example. Referring to FIG. 9 in conjunction with FIG. 2, a block diagram of an example of mobile communication device 4 is shown. Mobile communication device 4 includes a control unit 22 operably coupled to a memory 24, a wireless transceiver 6 using an antenna 34, a user interface 36, a speaker 38, and a microphone 40. In one example, mobile communication device 4 is a headset and wireless transceiver 6 is a DECT transceiver operating in the 5.8 GHz range.

Control unit 22 allows for processing data, in particular managing RSSI data between wireless transceiver 6 and memory 24 for determining which channel to operate mobile communication device 4. In one example, control unit 22 is a high performance, highly integrated, and highly flexible system-on-chip (SOC) having signal processing functionality. Control unit 22 may include a variety of processors (e.g., digital signal processors), with conventional CPUs being applicable.

Memory 24 may include a variety of memories, and in one example includes RAM, ROM, flash memory, or a combination thereof. Memory 24 may further include separate memory structures or a single integrated memory structure. In one example, memory 24 may be used to store passwords, network and telecommunications programs, and/or an operating system (OS). Memory 24 includes a mobile communication device control application 30 and a user interface application 32. User interface 36 allows for manual communication between the device user and the device, and in one example includes an audio and/or visual interface such that a prompt may be provided to the user's ear and/or an LED may be lit.

Memory 24 stores a native wireless protocol channel selector program 8 executed by control unit 22 to determine the operating channel of the mobile communication device 4. Native wireless protocol channel selector program 8 includes a shared frequency band analysis engine 28 and native wireless protocol channel quality engine 26. Where wireless transceiver 6 utilizes DECT, the interferer wireless protocol network corresponds to a wireless communication protocol other than DECT, such as IEEE 802.11.

Native wireless protocol channel quality engine 26 is configured to measure the quality of each available channel on which the mobile communication device 4 can transmit and receive data. In one example, the native wireless protocol channel quality engine 26 is configured to monitor the interference level of each channel. A constant scan is performed for interference levels for each time slot and for each carrier. In the DECT band, the process of scanning carriers for interference levels is set forth in the DECT regulatory protocol. Referring again to FIG. 4, in this TDMA system with 10 ms transmit framing, within the transmit frame there are twenty four time slots, with twelve for transmit and twelve for receive. For any individual time slot pair interference levels in both timeslots of a transmit/receive pair are scanned. In one example, a table of interference levels is created. In one example, the native wireless protocol channel selector program 8 identifies the native wireless communication protocol channels having the highest traffic or interference levels in order to avoid such channel frequencies when choosing an operating channel.

Utilizing shared frequency band analysis engine 28, native wireless protocol channel selector program 8 is operable to gather and process the plurality of network data associated with the interferer wireless communications protocol. In one example, utilizing the shared frequency band analysis engine 28, the channel selector program 8 is configured to scan a shared frequency band shared between the native wireless communications protocol and an interferer wireless communications protocol to identify an active interferer wireless communications protocol channel.

The channel selector program 8 is configured to remove from a list of selectable channels the native wireless communications protocol channels corresponding to the active interferer wireless communications protocol channel. Utilizing the output of the frequency band analysis engine 28 and the native wireless protocol channel quality engine 26, the channel selector program 8 is operable to select for usage a native wireless communications protocol channel from the list of selectable channels.

In one example, the channel selector program 8 is configured to scan only an interferer wireless communications protocol channel center frequency signal level for each channel of the interferer wireless communications protocol to identify an active interferer wireless communications protocol channel. The channel selector program 8 is further configured to scan the interferer wireless communications protocol channel center frequency for a native wireless communications protocol synchronization pattern.

In one example, the channel selector program 8 is further configured to periodically monitor a quality of the selected native wireless communications protocol channel during transmission on the selected native wireless communications protocol channel by scanning an interferer wireless communications protocol channel center frequency signal level, the interferer wireless communications protocol channel corresponding to the selected native wireless communications protocol channel.

In one example, the channel selector program 8 is further configured to periodically monitor the quality of a plurality of non-selected first wireless communications protocol channels by scanning an interferer wireless communications protocol channel center frequency signal level for each channel of the interferer wireless communications protocol not corresponding to the selected native wireless communications protocol channel, the scanning operable to identify one or more interferer wireless communications protocol channels in use.

Memory 24 may store network data associated with the interferer wireless protocol for use by native wireless protocol channel selector program 8 to identify the best native wireless protocol channel to operate. The native wireless protocol channel selector program 8 may implement a variety of algorithms to process the interferer wireless protocol data and select the desired native wireless communications channel.

While the exemplary embodiments of the present invention are described and illustrated herein, it will be appreciated that they are merely illustrative and that modifications can be made to these embodiments without departing from the spirit and scope of the invention. For example, the number of channels available for use will vary depending on the radio system implementation. Where the IEEE 802.11 protocol is discussed, such discussion may refer to any implementation, including IEEE 802.11 a/b/g/n. Furthermore, though reference is made to DECT and IEEE 802.11 in certain examples, other wireless communication protocols are applicable, either within the ISM band or outside the ISM band. Thus, the scope of the invention is intended to be defined only in terms of the following claims as may be amended, with each claim being expressly incorporated into this Description of Specific Embodiments as an embodiment of the invention.

What is claimed is:

1. A method for channel selection comprising:
    scanning a shared frequency band shared between a first wireless communications protocol and a second wireless communications protocol, the first wireless communications protocol utilized by a mobile communications device, the scanning comprising:
        identifying an active second wireless communications protocol channel;
        responsive to identifying the active second wireless communications protocol channel, identifying one or more first wireless communications protocol channels which do not require scanning;
    removing from a list of selectable channels one or more first wireless communications protocol channels corresponding to the active second wireless communications protocol channel; and
    selecting for usage a first wireless communications protocol channel from the list of selectable channels.

2. The method of claim 1, wherein identifying an active second wireless communications protocol channel further comprises scanning a second wireless communications protocol channel center frequency for a first wireless communications protocol synchronization pattern.

3. The method of claim 1, wherein the first wireless communications protocol is a Digital Enhanced Cordless Telecommunications protocol and the second wireless communications protocol is an IEEE 802.11 protocol.

4. The method of claim 1, further comprising scanning a second wireless communications protocol channel center frequency signal level for each channel of the second wireless communications protocol comprising monitoring an RSSI level.

5. The method of claim 1, further comprising scanning each first wireless communications protocol channel in the list of selectable channels to identify other users of the first wireless communications protocol.

6. The method of claim 1, further comprising following selecting for usage a first wireless communications protocol channel from the list of selectable channels:
    periodically monitoring a quality of a selected first wireless communications protocol channel, comprising scanning a second wireless communications protocol channel center frequency signal level, the second wireless communications protocol channel corresponding to the selected first wireless communications protocol channel; and
    periodically monitoring a quality of a plurality of non-selected first wireless communications protocol channels, comprising:
        scanning a second wireless communications protocol channel center frequency signal level for each channel of the second wireless communications protocol not corresponding to the selected first wireless communications protocol channel, the scanning operable to identify one or more second wireless communication protocol channels in use; and validating as available for use non-selected first wireless communications protocol channels corresponding to each channel of the second wireless communications protocol not in use.

7. The method of claim 6, wherein periodically monitoring a quality of a selected first wireless communications protocol channel further comprises scanning the second wireless communications protocol channel center frequency for a first wireless communications protocol synchronization pattern.

8. The method of claim 6, wherein periodically monitoring a quality of a plurality of non-selected first wireless communications protocol channels further comprises scanning the second wireless communications protocol channel center frequency for a first wireless communications protocol synchronization pattern.

9. A mobile communication device comprising:
a processor;
a transceiver to transmit and receive data using a native wireless communications protocol;
an antenna; and
a memory storing a channel selection application configured to scan a shared frequency band shared between the native wireless communications protocol and an interferer wireless communications protocol to identify an active interferer wireless communications protocol channel, wherein the channel selection application is configured to remove from a list of selectable fixed channels one or more fixed native wireless communications protocol channels corresponding to the active interferer wireless communications protocol channel, the channel selection application further configured to select for usage a fixed native wireless communications protocol channel from the list of selectable fixed channels.

10. The mobile communication device of claim 9, wherein the channel selection application is configured to scan an interferer wireless communications protocol channel center frequency signal level for each channel of the interferer wireless communications protocol to identify an active interferer wireless communications protocol channel.

11. The mobile communication device of claim 10, wherein the channel selection application is further configured to scan the interferer wireless communications protocol channel center frequency for a native wireless communications protocol synchronization pattern.

12. The mobile communication device of claim 9, wherein the channel selection application is further configured to scan each fixed native wireless communications protocol channel in the list of selectable fixed channels to identify other users of the native wireless communications protocol.

13. The mobile communication device of claim 9, wherein the native wireless communications protocol is a Digital Enhanced Cordless Telecommunications protocol and the interferer wireless communications protocol is an IEEE 802.11 protocol.

14. The mobile communication device of claim 9, wherein the channel selection application is further configured to periodically monitor a quality of a selected fixed native wireless communications protocol channel during transmission on the selected fixed native wireless communications protocol channel by scanning an interferer wireless communications protocol channel center frequency signal level, the interferer wireless communications protocol channel corresponding to a selected fixed native wireless communications protocol channel.

15. The mobile communication device of claim 9, wherein the channel selection application is further configured to periodically monitor a quality of a plurality of non-selected fixed first wireless communications protocol channels by scanning an interferer wireless communications protocol channel center frequency signal level for each channel of the interferer wireless communications protocol not corresponding to a selected fixed native wireless communications protocol channel, the scanning operable to identify one or more interferer wireless communications protocol channels in use.

16. A method for channel selection comprising:
scanning a shared frequency band shared between a first wireless communications protocol and a second wireless communications protocol comprising scanning each channel of the second wireless communications protocol falling within the shared frequency band to identify an active second wireless communications protocol channel;
scanning the active second wireless communications protocol channel for a first wireless communications protocol synchronization pattern to confirm second wireless communications protocol activity;
removing from a list of selectable channels one or more first wireless communications protocol channels corresponding to the active second wireless communications protocol channel; and
selecting a first wireless communications protocol channel from the list of selectable channels.

17. The method of claim 16, wherein the first wireless communications protocol is a Digital Enhanced Cordless Telecommunications protocol and the second wireless communications protocol is an IEEE 802.11 protocol.

18. The method of claim 16, wherein scanning each channel of the second wireless communications protocol comprises scanning a center frequency of each channel.

19. The method of claim 16, further comprising scanning each first wireless communications protocol channel in the list of selectable channels.

20. The method of claim 16, wherein following selecting the first wireless communications protocol channel, the method further comprises scanning a second wireless communications protocol channel center frequency signal level, the second wireless communications protocol channel corresponding to a selected first wireless communications protocol channel.

21. The method of claim 20, further comprising selecting a new usable first wireless communications protocol channel responsive to identification of an active second wireless communications protocol channel while scanning the second wireless communications protocol channel center frequency signal level.

22. The method of claim 20, wherein following selecting the first wireless communications protocol channel, the method further comprises scanning a second wireless communications protocol channel center frequency signal level for each channel of the second wireless communications protocol not corresponding to the selected first wireless communications protocol channel, the scanning operable to identify one or more second wireless communication protocol channels in use.

23. The method of claim 22, further comprising generating a list of usable first wireless communications protocol channels responsive to an identification of the one or more second wireless communication protocols in use.

* * * * *